(12) United States Patent
Weissman

(10) Patent No.: US 10,962,639 B2
(45) Date of Patent: Mar. 30, 2021

(54) SMALLSAT SURVEILLANCE CONSTELLATION USING MIMO RADAR

(71) Applicant: Isaac Weissman, Washington, DC (US)

(72) Inventor: Isaac Weissman, Washington, DC (US)

( * ) Notice: Subject to any disclaimer, the term of this patent is extended or adjusted under 35 U.S.C. 154(b) by 0 days.

(21) Appl. No.: 16/602,965

(22) Filed: Jan. 9, 2020

(65) Prior Publication Data
US 2020/0233080 A1    Jul. 23, 2020

Related U.S. Application Data

(60) Provisional application No. 62/918,083, filed on Jan. 11, 2019.

(51) Int. Cl.
*G01S 13/90* (2006.01)
*B64G 1/10* (2006.01)

(52) U.S. Cl.
CPC ...... *G01S 13/9027* (2019.05); *G01S 13/9076* (2019.05); *B64G 1/1085* (2013.01)

(58) Field of Classification Search
CPC ............. G01S 13/9027; G01S 13/9076; B64G 1/1085
See application file for complete search history.

(56) References Cited

U.S. PATENT DOCUMENTS

| | | | |
|---|---|---|---|
| 4,843,397 A * | 6/1989 | Galati | B64G 1/1021 342/354 |
| 6,725,012 B1 | 4/2004 | Janson et al. | |
| 7,468,695 B1 * | 12/2008 | Williams | F41G 3/06 342/357.37 |
| 7,994,965 B2 | 8/2011 | Longstaff | |
| 8,427,360 B2 | 4/2013 | Longstaff | |
| 8,896,479 B2 * | 11/2014 | Wang | G01S 19/21 342/16 |
| 10,145,936 B2 | 12/2018 | Kishigami et al. | |

(Continued)

FOREIGN PATENT DOCUMENTS

WO    WO-2018231515 A1 *    12/2018    ........... G01S 13/878

OTHER PUBLICATIONS

P. Gogineni et al., "A CubeSat Train for Radar Sounding and Imaging of Antarctic Ice Sheet," IGARSS 2018—2018 IEEE International Geoscience and Remote Sensing Symposium, Valencia, 2018, pp. 4138-4141, doi: 10.1109/IGARSS.2018.8519162. (Year: 2018).*

(Continued)

*Primary Examiner* — Marcus E Windrich

(57) ABSTRACT

A method and system are presented for the formation of a constellation of small satellites (smallsats) for radar surveillance employing multiple input, multiple output (MIMO) radar operation. Such a constellation can be used for cost-effective fine angular resolution and persistent remote sensing of targets or regions above, below, or upon a planet's surface. Applications include, but are not limited to, surface mapping (including change detection), mapping of meteorological conditions, and monitoring of time-varying events. The method and system pertain to satellite configurations whose costs and aggregate masses are much less than those of traditional space-based radar measurements attempting to attain comparable angular resolution, while also providing intervals of persistent surveillance.

12 Claims, 5 Drawing Sheets

(56) References Cited

U.S. PATENT DOCUMENTS

| | | | | |
|---|---|---|---|---|
| 2003/0149512 | A1* | 8/2003 | Hrovat | B60T 8/172 |
| | | | | 701/1 |
| 2007/0118286 | A1* | 5/2007 | Wang | G01S 19/26 |
| | | | | 342/357.59 |
| 2009/0069957 | A1* | 3/2009 | Nakamura | G05D 1/0094 |
| | | | | 701/3 |
| 2009/0102704 | A1* | 4/2009 | Fujimura | G01S 7/025 |
| | | | | 342/25 A |
| 2011/0221625 | A1 | 9/2011 | Comic et al. | |
| 2012/0293669 | A1* | 11/2012 | Mann | G01C 11/025 |
| | | | | 348/207.11 |
| 2013/0135443 | A1* | 5/2013 | Martinerie | G01C 11/06 |
| | | | | 348/47 |
| 2016/0043800 | A1* | 2/2016 | Kingsbury | H04B 7/18517 |
| | | | | 398/125 |
| 2016/0093124 | A1* | 3/2016 | Shi | G05B 19/042 |
| | | | | 701/2 |
| 2016/0114887 | A1* | 4/2016 | Zhou | H04N 5/265 |
| | | | | 348/148 |
| 2016/0204840 | A1* | 7/2016 | Liu | G01S 13/904 |
| | | | | 375/267 |
| 2017/0233070 | A1* | 8/2017 | Starace | B64C 27/57 |
| | | | | 244/7 B |
| 2017/0285178 | A1* | 10/2017 | Platzer | G01S 19/45 |
| 2017/0320570 | A1* | 11/2017 | Horn | B64C 29/02 |
| 2018/0037336 | A1* | 2/2018 | Rammos | H04W 84/005 |
| 2018/0172823 | A1* | 6/2018 | Tyc | B64G 1/1021 |
| 2019/0229805 | A1* | 7/2019 | Velazco | H04B 10/503 |
| 2019/0389602 | A1* | 12/2019 | Schilling | B64G 1/285 |

OTHER PUBLICATIONS

Rahmat-Samil, Y., et al, "For Satellites, Think Small, Dream Big," Fig. 3, IEEE Antennas and Propagation Magazine, pp. 22-30, Apr. 2017.

Bergin, J. and Guerci, J. R., "MIMO Radar: Theory and Application," Artech House, 2018.

Davis, M. S., Showman, G. A., and Lanterman, A. D., "Coherent MIMO Radar: The Phased Array and Orthogonal Waveforms," IEEE Aerospace and Electronics Magazine, Aug. 2014.

Kilpatrick, T. and Longstaff, I. D., "Generalising the co-array, for SAR and MIMO Radar," IEEE International Radar Conference Record, Washington, DC, May 2015.

Fuhrmann, D. R. and San Antonio, G., "Transmit Beamforming for MIMO Radar SystemsUsing Partial Signal Correlation," IEEE Thirty-Eighth Asilomar Conference on Signals, Systems and Computers, 2004.

Steyskal, H., et al, "Pattern Synthesis for TechSat21—A Distributed Space-Based Radar System," IEEE Antennas and Propagation Magazine, pp. 19-25, Aug. 2003.

Sakovsky, M., et al, "Rapid design of deployable antennas for cubesats," IEEE Antennas and Propagation Magazine, pp. 50-58, Apr. 2017.

Cheston, T. C. and Frank, J., "Phased Array Radar Antennas." Chapter 7 in "Radar Handbook, 2nd Ed.," M. I. Skolnik (Editor), McGraw-Hill, 1990.

Gao, S., et al, "Antennas for Modern Small Satellites," IEEE Antennas and Propagation Magazine, pp. 40-56, Aug. 2009.

Cooley, M., "RF Design and Development of a Deployable Membrane Reflectarray Antenna for Space," IEEE Phased Array Systems and Technology Symposium, Waltham, MA, Oct. 2019.

Slattery, B. R., "Use of Mills Cross receiving arrays in radar systems," Proc. IEE, pp. 1712-1722, Nov. 1966.

Raney, R. K., "Space-Based Remote Sensing Radars," Chapter 16 in Radar Handbook, 3rd Ed., M. I. Skolnik (Editor), McGraw-Hill, 2009.

Florida State University, https://www.coaps.fsu.edu/scatterometry/about/overview/php.

Nathanson, F. E., Chapter 7 in "Radar Design Principles," 2nd Edition, McGraw-Hill, 1990.

Peral, E., et al, "Radar technologies for earth remote remote sensing from cubesat platforms," Proc. IEEE, pp. 404-418, Mar. 2018.

Niederstrasser, C., "Small launch vehicles—a 2018 state of the industry survey," 32nd Annual AIAA/USU Conference on Small Satellites, 2018.

Weissman, I., "Smallsat Surveillance Constellations Using MIMO Radar," IEEE Phased Array Systems and Technology Symposium, Waltham, MA, Oct. 2019.

Donnet, B. J., MIMO Radar, Techniques and Opportunities, Proceedings of 3rd European Radar Conference, 2006.

Chernyak, V. S., "On the Concept of MIMO Radar," IEEE International Conference Record, Washington, DC, 2010.

Gogineni, P., et al, "A CubeSat Train for Radar Sounding and Imaging of Antarctic Ice Sheet," IEEE International Geoscience and Remote Sensing Symposium, 2018.

* cited by examiner

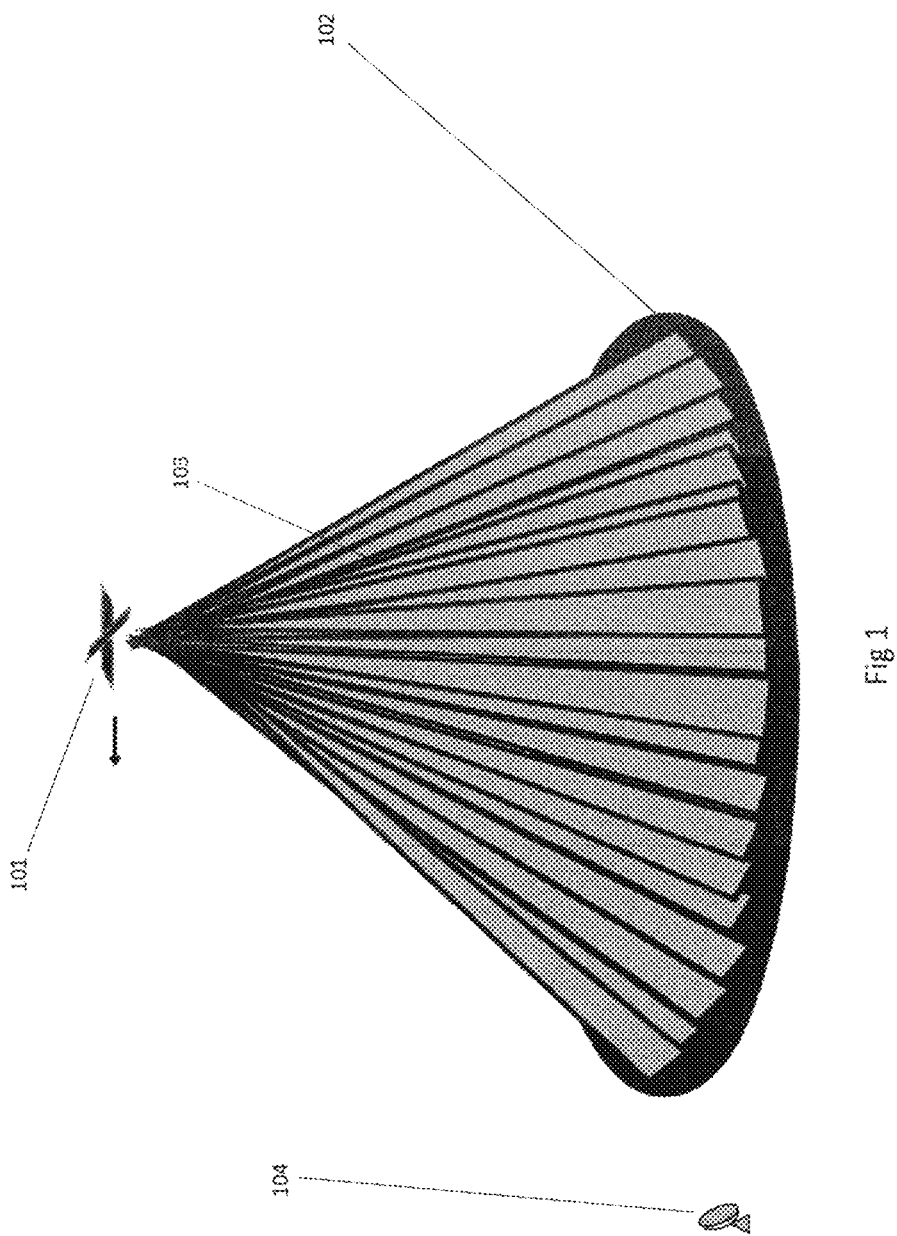

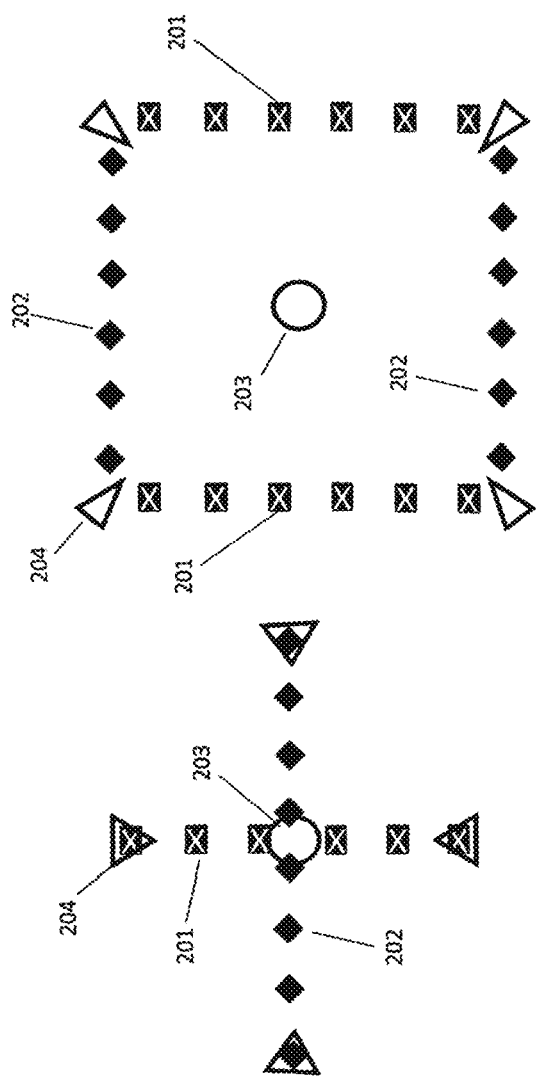

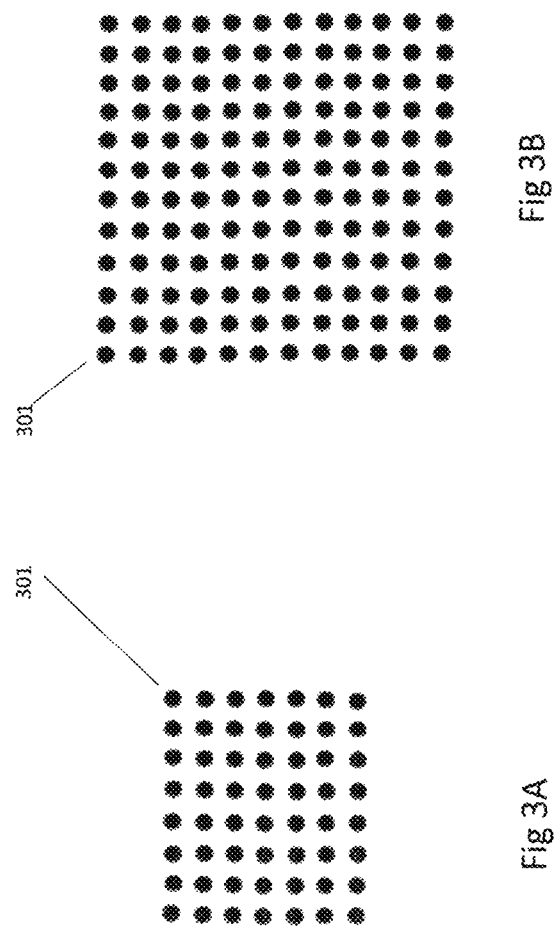

SMALLSAT SURVEILLANCE CONSTELLATION USING MIMO RADAR

CROSS REFERENCE TO RELATED APPLICATIONS

This application claims the benefit of U.S. Provisional Application No. 62/918,083, filed Jan. 11, 2019, entitled "Smallsat Surveillance Constellation Using MIMO Radar," the entire contents of which is herein incorporated by reference, for all purposes.

TECHNICAL FIELD

The instant invention relates to the field of electromagnetic sensing from space of targets lying within a spatial region of the surface of a planet, such as Earth.

BACKGROUND OF THE INVENTION

Electromagnetic measurements made from space of targets that lie within a spatial region above, on or below the surface of a planet, such as Earth, are generally of interest to the civilian sector, the military sector, and the intelligence community. In particular, the use of radar, employing radio frequencies (RF), permits day and night observations and the ability to penetrate weather conditions such as cloud cover.

Present day surveillance of the Earth conducted from satellite platforms generally involves the use of large and heavy satellites, which entails high development and launch costs, the lack of graceful mission degradation in the event of satellite malfunction or other disability, and insufficient detection sensitivity or resolution for certain missions.

It is well known that the angular resolution obtainable from a radar system, that is, the minimum separation of targets that can be independently observed, is inversely related to the overall size of the radar antenna aperture. A fine angular resolution is obtainable whether the aperture is physical (i.e., actual) or "virtual." An extended virtual aperture can be created by implementing a "multiple output, multiple output" (MIMO) arrangement of transmitters and receivers in physical patterns. In typical MIMO implementations, the larger the number of such transmitter and receiver elements, the larger the virtual aperture. In addition, the larger the number, the smaller and lighter each element can be for a desired radar sensitivity level.

The term "smallsat" refers here to small orbiting spacecraft having mass within the range from 500 kilograms down to less than one kilogram. Smalisats, due to their low mass and low volume, can be deployed into orbit in large quantities using a single launch vehicle or a few launch vehicles, or by means of prior storage aboard space stations. This leads to substantial cost savings compared to conventional satellites, while also permitting the "graceful" degradation of mission operations in the event of malfunction or destruction—caused, for example, by orbital debris. Moreover, after initial deployment of a smallsat constellation, the constellation can be further augmented by launching more smallsats. For these reasons, a constellation of smallsats can provide overall improved effectiveness as contrasted with conventional large satellite systems.

The employment of numerous MIMO transmitters and receivers, while collectively providing a sizeable average power and an aggregate physical aperture area for achieving various levels of detection sensitivity, can individually remain limited in size and weight; therefore, the employment of a constellation of smallsats as host platforms for the individual physical MIMO elements represents a natural compatibility.

The potential advantages of combining the use of MIMO with smallsats include the attainment of fine angular resolution that is otherwise available only with much costlier and heavier spacecraft systems. An improvement in resolution can greatly benefit remote sensing of planetary regions. In the case of Earth, these benefits include, for example, soil conditions, flood progression, deforestation, ice formations, and changes in these. In addition, the combination permits persistent observation for detecting fleeting (temporary) events, such as ocean wave behavior and weather turbulence, over the entire surveillance sector. The overall operation of this combination moreover exploits the inherent benefits of smallsats, which include lower launch costs, graceful constellation degradation, and direct in-orbit augmentation with additional smallsats—thereby further enhancing angular resolution and detection sensitivity.

SUMMARY

A method and system are presented wherein a physical constellation of small satellites ("smallsats") is equipped with radar or other electromagnetic sensors, to be used in association with "multiple input, multiple output" (MIMO) techniques to provide high resolution remote sensing of spatial regions near a planet's surface. By employing MIMO, such a configuration can form a large aperture of "virtual" antenna elements, thereby forming a large number of effective receiving beams, resulting in fine angular resolution while providing persistent surveillance of a large surveillance sector—and while also limiting the amount of actual (physical) RF hardware in orbit.

BRIEF DESCRIPTION OF THE DRAWINGS

The embodiments of the invention to be described herein will be more easily understood in conjunction with the following drawings:

FIG. 1 is a generalized depiction of the smallsat-MIMO method, not drawn to scale.

FIG. 2A is a schematic representation of an illustrative "baseline" constellation.

FIG. 2B is a schematic representation of an illustrative "picture frame" constellation.

FIG. 3A is a schematic representation of the virtual array corresponding to the "baseline" illustration of FIG. 2A.

FIG. 3B is a schematic representation of the virtual array corresponding to the "picture frame" illustration of FIG. 2B.

DETAILED DESCRIPTION OF INVENTION

Figure 4A:
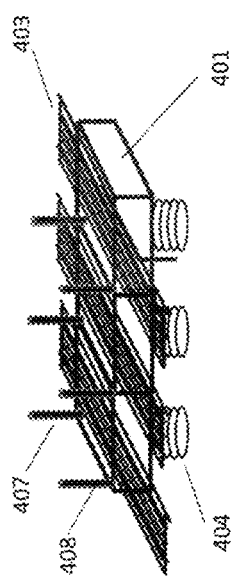
FIG. 4A is an isometric drawing of an illustrative "docked" smallsat arrangement.

The instant invention involves a constellation of small satellites (smallsats), such as that 101 indicated in FIG. 1, for radar or other electromagnetic surveillance, in association with MIMO processing techniques, to provide high-resolution measurements of a spatial region, such as that 102 depicted in FIG. 1, in proximity to the surface of a planet such as Earth. Such a constellation can be employed for various applications, including, but not limited to, remote sensing and mapping of the surface, real-time land, sea, and meteorological surveillance, and documenting important environmental changes such as glacial flow, floods, and deforestation. In addition, the method permits persistent observation for detecting fleeting events over the entire surveillance sector.

More specifically, by employing a limited number of smallsats carrying actual electromagnetic transmitters and receivers, such as those 201 and 202, respectively, depicted in FIG. 2, and including MIMO generation and processing techniques, the configuration can form a virtual aperture, such as that 301 depicted in FIG. 3, which behaves, in terms of beam patterns, as an array of actual antenna elements at the same locations as the virtual elements. Thus, a large number of simultaneous narrow receiving beams, such as those 103 depicted in FIG. 1, can be formed, resulting in fine angular measurements of radar targets or of regions in the vicinity of a planet's surface, while providing persistent surveillance of fleeting events (e.g., earthquakes, tsunamis, tornadoes).

By contrast, a non-MIMO smallsat configuration can attain similar angular resolution and persistence by populating a constellation with conventional radar hardware at the locations of the aforementioned virtual antenna elements. This would, however, impose high aggregate RF hardware costs, as well as high aggregate launch mass and launch costs, typically far in excess of those of the instant invention. In the instant invention, by properly "filling" such an "unthinned" virtual aperture using MIMO techniques, the formation of angular "grating lobes" (i.e., spurious undesired secondary beams) is substantially avoided.

As pointed out by Chernyak, V. S., "On the Concept of MEMO Radar," IEEE International Radar Conference, 2010, Section IV, MIMO radars can lead to important advantages, including "increased angle resolution" and searching for "targets in a wide sector without scanning." (The latter advantage permits the persistent surveillance referred-to above.)

While many space-based radar measurements—particularly those involving surveillance of unchanging or slowly varying regions such as land terrain or icecap extent—can be carried out using synthetic aperture radar (SAR) or interferometric SAR, these methods are generally not practical for targets or regions with short coherence times. For example, when observing quickly changing events such as ocean waves, tornadoes, and other weather events, the MIMO approach described herein has much to offer beyond the use of SAR.

Specifically, two articles of Prior Art, namely Foreign Patent WO2018231515 to Maschhoff and Ryba and Gogineni, P., et al, "A CubeSat Train for Radar Sounding and Imaging of Antarctic Ice Sheet," 2018 IEEE International Geoscience and Remote Sensing Symposium, achieve a degree of along-track resolution resulting from the SAR operation associated with their satellites's orbital motion. However, that along-track resolution is limited by the coherence time of the targets within the surveillance sector, as pointed out in Foreign Patent WO2018231515 by Maschhoff and Ryba. By contrast, the instant invention can attain, at least in principle, an unlimited degree of along-track resolution regardless of orbital motion.

The virtual apertures, such as, but not restricted to, those 301 depicted in FIG. 3, provide high resolution of targets within the surveillance sector without relying on, or being significantly affected by, the orbital motion of the smallsat constellation, such as the one 101 depicted in FIG. 1. This is in contrast to other methods of attaining high resolution by space-based radar, such as synthetic aperture radar (SAR), the latter relying on orbital motion to implement the SAR measurements. To distinguish these two disparate approaches, one can refer to the one not relying on orbital motion by the name "Pure MEMO." The exercise of Pure MIMO is well exemplified by the Illustrative Embodiment described below.

The configurations included in this present method are those consisting of smallsats, each smallsat containing transmitting equipment, or receiving equipment, or both. Each transmitter, such as the one 201 represented in FIG. 2, transmits a different waveform and each receiver, such as the one 202 represented in FIG. 2, receives all the target echoes corresponding to these different waveforms.

As stated in Section I of the reference Davis, M. S., Showman, G. A., and Lanterman, A. D., "Coherent MIMO Radar: The Phased Array and Orthogonal Waveforms," IEEE Aerospace and Electronic Systems Magazine, Part II of II, August 2014, "MEMO radar is realized by transmitting independent waveforms . . . ."

By far, the most commonly considered transmitted MIMO independent waveforms are those that are "orthogonal." By orthogonal waveforms is meant those for which their modulations are such that, ideally, the multiplicity of the modulations of the received echoes at each receiver are totally uncorrelated. It should be observed that, since orthogonal transmissions are uncorrelated, each separate transmitter normally illuminates a wide angular sector. This sector is here termed the "surveillance sector." The size of a surveillance sector is inversely related to the directive gain of each transmitting antenna. As a general consideration, the size of a surveillance sector as observed from space can be very large compared to airborne or surface-based surveillance.

Except for a brief mention of partially-correlated waveforms below, the remainder of this Specification will only consider orthogonal waveforms in order to simplify the discussion. This should not be construed, however, as omitting more general independent waveforms (e.g., partially-correlated waveforms) from inclusion in the instant invention.

In accordance with a preferred embodiment of the instant invention, transmitters of the smallsat constellation transmit a plurality of overlapping wide beams with orthogonal waveforms toward a planet. The uncorrelated reflected echoes are detected by a plurality of receivers. Ideally, within each receiver is a set of "matched filters," each matched to a separate orthogonal echo waveform, thereby selecting that waveform and substantially blocking all others. The output of each matched filter then corresponds to a single array element of the virtual aperture. The selected matched filter outputs are then coherently combined in a central processor, such as 203 in FIG. 2, with the other matched filter outputs, in order to form narrow surveillance beams created by this virtual aperture.

Additionally depicted in FIG. 1 is a base station 104, in this case located on the Earth's surface, for reporting the measurements, for generating instructions to be transmitted_to the smallsat constellation, and for recording the post-processed data.

In the formation of the received beam cluster, amplitude and phase weights can be applied to reduce or shape beam sidelobe levels and to create pattern nulls for interference suppression.

Orthogonal waveforms used to modulate the transmitted waves can take a variety of forms. One form uses coded pulses, in which case each matched filter output represents "pulse compression," as is common in most radar systems; in this form, the pulse duration should be short enough to avoid proliferating the number of matched filters in order to cover the spread of Doppler frequencies due to the constellation's orbital motion. The coded pulse can be repeated at range unambiguous intervals (i.e., at sufficiently low pulse repetition frequency) to allow extended coherent integration, thereby permitting the enhancement of detection sensitivity. (It should also be noted that each received coded pulse can be processed digitally.)

A second form uses separate carrier frequencies, for which the matched filters are simply ordinary band-limited electronic filters, which can be constituted digitally using, for example, the fast-Fourier transform; in this form, the carrier frequencies should be separated by at least the aforementioned Doppler frequency spread due to the orbital motion.

A preferred choice of orthogonal waveforms combines the above-mentioned forms, internationally-established frequency allocations permitting. The incorporation of a coded pulse into the separated carrier frequencies permits the unambiguous determination of echo range within each virtual beam; for this choice, a single pulse code can be used for all of the separated carrier frequencies. This choice, however, requires that the carrier frequency separations be increased to accommodate the bandwidth associated with the coded pulse.

Other orthogonal waveforms may be employed, such as time-division multiplexing, as is well known by those skilled in the art.

Theoretically, as a formality, it is not required that the MIMO signals be totally orthogonal in a mathematical sense, only that there be a measurable distinction in the waveforms. (See paper by Fuhrmann, D. R. and San Antonio, G., "Transmit Beamforming for MIMO Radar Systems Using Partial Signal Correlation," IEEE Thirty Eighth Asilomar Conference on Signals, Systems and Computers, 2004.) Although the instant invention can be operated with such a partially-correlated set of waveforms, the latter is not considered advantageous for any of the contemplated measurement applications.

Smallsat constellations employing MIMO to attain fine resolution can be configured in many ways. FIG. 2A and FIG. 2B schematically depict two illustrative configurations, termed "baseline" and "picture-frame," respectively. (For the depicted configurations, a small number of smallsats are shown for purposes of illustrating the method; typically, a much larger number would be employed for many applications.) It should be noted that the examples depicted are not exhaustive and do not preclude other configurations for the present invention.

As mentioned earlier, existing smallsat constellations can be augmented with the deployment of additional smallsats. Such an augmentation can (a) allow substitution of defective existing smallsats, (b) increase the detection sensitivity by increasing the aggregate transmitted power and cumulative receive aperture area, and (c) further improve the angular resolution of surveillance observations due to the resulting narrower received beams.

In various embodiments of the present method, a constellation comprises numerous smallsats, configured in a "dense" and "fixed" formation. By a dense formation is meant one that employs spacings between adjacent smallsats that are small enough to provide a "filled" virtual aperture and to thereby avoid grating lobes. Certain esoteric approaches for avoiding grating lobes, such as tuning the transmitted pulse repetition frequency (PRF), as suggested by Steyskal, H., et al, "Pattern Synthesis for TechSat21—A Distributed Space-Based Radar System," IEEE Antennas and Propagation Magazine, pp. 19-25, August 2003, are not considered in the instant invention as comprising a filled virtual aperture. By a fixed formation is meant that, except for unintentional perturbations, one where the locations and orientations of the individual smallsats in relation to one another remain unchanged within a particular constellation over a selected measurement interval. These spacings and fixed relative locations are in contrast with sparser and variably-spaced spacecraft configurations presented elsewhere (Steyskal, H., et al, "Pattern Synthesis for TechSat21—A Distributed Space-Based Radar System," IEEE Antennas and Propagation Magazine, pp. 19-25, August 2003).

In such configurations, each transmitting smallsat contains, among other components, an RF power amplifier. Each receiving smallsat contains, among other components, a "front-end" amplifier. As illustrated in FIG. 4, each smallsat also contains: an appropriate deployable radar antenna 404, which can be either an electronically-phase-steered subarray or a mechanically-steered antenna, as well as a deployable solar energy collector 403 to generate prime power; and a means for storing energy (not shown).

Additionally depicted in FIG. 2A and FIG. 2B are thrusters 204 attached to the smallsat constellation. These thrusters permit a constellation to be oriented to face in any direction; they also enable a constellation to maintain a planet-centered orientation as it proceeds along its orbit. The latter capability, using thrusters to control the entire constellation, obviously does not apply to the "free-flying" smallsat arrangement discussed below in connection with FIG. 4C.

FIG. 3A and FIG. 3B schematically depict the virtual array elements 301 formed by the MIMO processing of the configurations depicted in FIG. 2A and FIG. 2B, respectively. Virtual elements are formed approximately at the midpoints of all of the possible transmitting and receiving pairings, with spacings half as close as the spacings between the actual smallsats (FIG. 3 in Donnet, B. J., "MIMO Radar, Techniques and Opportunities," Proc. of $3^{rd}$ European Radar Conference, 2006 and Kilpatrick, T. and Longstaff, I. D., "Generalising the co-array, for SAR and MIMO radar," IEEE International Radar Conference Record," Washington, D.C., May 2015). Thus, for M physical transmitting smallsats and N physical receiving smallsats, the total number of virtual array elements is the product of M and N. For example, if fifty transmitting smallsats and one-hundred receiving smallsats are employed, the total number of virtual array elements is 5000, whereas the actual number of smallsats is only one-hundred and fifty. Thus, fine resolution, and the associated high precision, is obtainable without incurring high costs of RF hardware.

However, the substantial cost savings for RF components should be balanced against the large amount of processing required to realize the advantages of the MIMO operation. This processing load may constitute the main drawback of the present method, but future advances in digital technology are expected to help to mitigate this drawback. There are, in addition, other issues associated with the method of this invention. A major issue is that of calibration; that is, the correction of amplitudes and phases among the transmitting smallsats and receiving smallsats, as well as the pointing of their antennas. An absence of adequate calibration could result in excessive angular sidelobe levels. However, similar calibration procedures are necessary in conventional phased-array antennas, so that the execution of such calibrations is not unusual. For the present method, a convenient calibration procedure can employ controlled RF transmissions from the aforementioned ground stations 104.

Figure 4B:
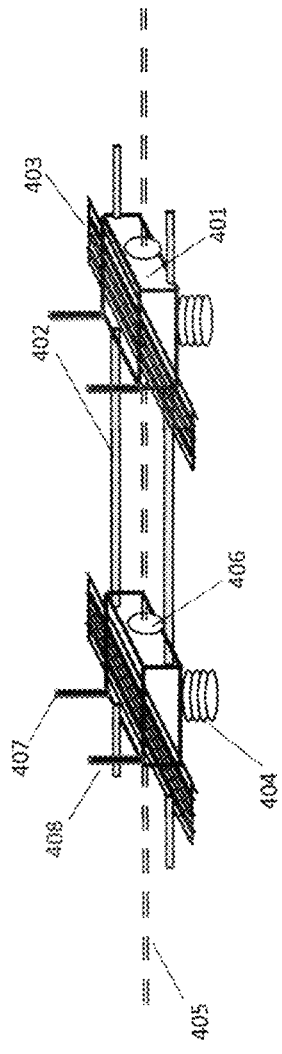
FIG. 4B is an isometric drawing of an illustrative "connected" smallsat arrangement.
Figure 4C:
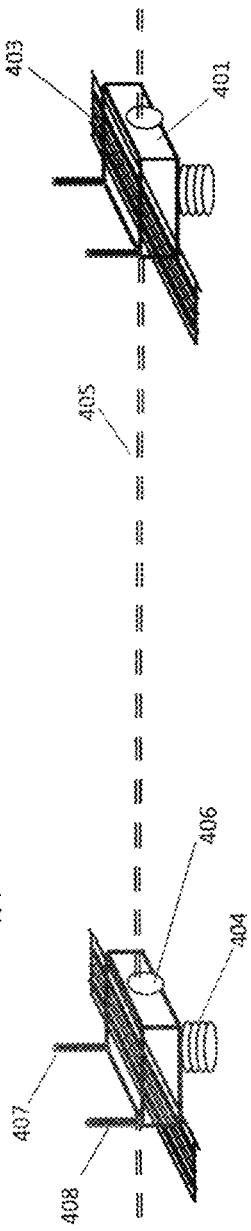
FIG. 4C is an isometric drawing of an illustrative "free-flying" smallsat arrangement.

FIG. 4A, FIG. 4B, and FIG. 4C contain illustrative isometric drawings showing three alternative arrangements for adjacent smallsats in the present method. The arrangements depicted are termed, respectively, "docked," "connected," and "free-flying." A docked arrangement, where adjacent smallsats are directly attached, is practical when the constellation design dictates small MIMO component spacings. A connected arrangement allows adjacent smallsats to be appropriately located using lightweight rigid tie rods 402; these tie rods could can be fixed or employ a "telescoping" feature to allow spacing changes for successive measurements or to facilitate storage prior to constellation deployment. For larger spacings, the free-flying arrangement may be more practical.

Each smallsat is ordinarily deployed in the form of a container 401, with a solar collector 403 and radar antenna 404 deployed after separation from the launch vehicle or space station, as the case may be.

Some bending, twisting, or warping of a constellation is to be anticipated and this could, if pronounced, adversely affect the radar beam patterns. To deal with this issue, a sensing capability is required to monitor the relative position and orientation of each smallsat. Such a capability may include, among other navigation approaches, appropriately-shaped laser beams 405 between adjacent smallsats impinging upon a pattern of photodetectors 406. Other sensing means exist: For example, U.S. Pat. No. 6,725,012 to Janson, et al, describes station-keeping approaches using differential GPS as well as by collecting RF transmissions from a cluster of subsatellites. A direct approach would use coherent RF or laser transmissions from ground stations.

Orientation errors can be compensated by means of electronic or mechanical antenna pointing adjustments, depending on whether an electronic subarray or a swiveling mechanical pointing method is employed. Position errors, if minor, can be compensated by a phase-angle adjustment of the RF carrier on the affected smallsat(s), provided the phase-angle adjustment is a small fraction of the RF carrier period. When such adjustments are insufficient, small microthrusters 503, included on the smallsats, can be used to effect the needed corrections. Note that, in any case, such microthrusters or larger thrusters are essential for a free-flying arrangement to maintain the smallsat positions and orientation within an entire constellation.

FIG. 4A, FIG. 4B, and FIG. 4C each also includes a communications antenna 407 for a link connection to the central processor 204 and a GPS receiving antenna 408.

The drawings of FIG. 4A, FIG. 4B, and FIG. 4C should not be taken as excluding other smallsat arrangements in the present method.

Figure 5B:
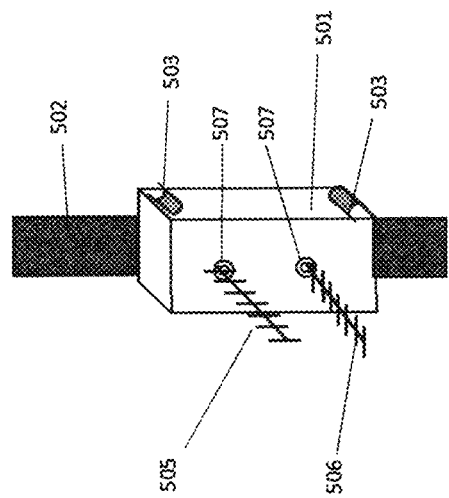
FIG. 5B is an isometric drawing illustrating a downlooking face of a receiving smallsat.
Figure 5A:
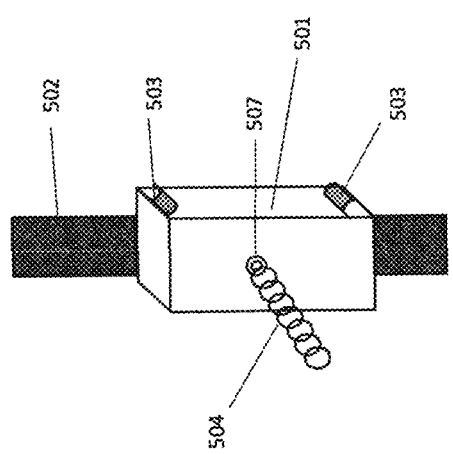
FIG. 5A is an isometric drawing illustrating a downlooking face of a transmitting smallsat.

FIG. 5A and FIG. 5B represent isometric views of the downlooking surfaces of the transmitting and receiving smallsats, respectively. Shown are components previously described, including containers 501, solar collectors 502, and microthrusters 503. The main purpose here is to describe the illustrative radar antennas 504, 505, 506. Shown, as an example, is a helical transmitting antenna 504 (Sakovsky, M., et al, "Rapid design of deployable antennas for cubesats," IEEE Antennas and Propagation Magazine, pp. 50-58, April 2017) which transmits circular polarization signals, thereby avoiding the effects of Faraday rotation when transiting the earth's ionosphere. Often, dual-polarized observations are desired for space-based radar measurements, especially those for remote sensing of the environment. (Note that circular polarization is equivalent to two perpendicular linear polarizations, appropriately phased in quadrature.) For the present method, and using the aforementioned helical transmitting antenna 504, dual-polarized observations can be readily made using receiving antenna approaches such as the quadrifilar-helix design (Gao, S., et al, "Antennas for Modern Small Satellites," IEEE Antennas and Propagation Magazine, pp. 40-56, August 2009), or more simply by employing dual endfire antennas oriented perpendicularly, as shown 505, 506. Also, these antennas 504, 505, 506 can be mechanically pointed in a desired direction and toward a selected surveillance sector with the aid of rotary joints 507. Note that the dual endfire antennas 505, 506 can be phased to provide either perpendicular linear or same-sense or opposite-sense circular polarization.

It is emphasized that the antenna types depicted are purely illustrative and do not exclude many other pertinent types, such as deployable paraboloids (Sakovsky, M., et al, "Rapid design of deployable antennas for cubesats," IEEE Antennas and Propagation Magazine, pp. 50-58, April 2017), membrane antennas (for example, Cooley, M., "RF Design and Development of a Deployable Membrane Reflectarray Antenna for Space," 2019 IEEE Phased Array Systems and Technology Symposium, Waltham, Mass., October 2019), or small phased arrays, from being employed for the present method.

The directive gain of a chosen antenna type plays an important role for both the detection sensitivity of the measurement and for the smallsat configuration parameters (such as smallsat spacings). The higher the directive gain, the further apart can be adjacent smallsats without incurring undesirable grating lobes (Cheston, T. C. and Frank, J., "Phased Array Radar Antennas," Chapter 7 in Radar Handbook, 2nd Ed., M. I. Skolnik, Editor, McGraw-Hill, 1990)—and hence the finer the angular resolution. (The formulae of Cheston and Frank, cited above, related to grating lobe avoidance for two-way paths, are adjusted in the illustrative embodiment herein to apply to a one-way receiving path.)

As a practical matter, the individual transmitted RF average power levels are constrained by the smallsat weight and volume capacities. However, the aggregate total power is determined by the total number of transmitting smallsats, so that, for large constellations, it can be quite substantial and thereby advantageous for increasing the detection sensitivity.

The bounds of operation for the present method, for Earth observations, include the following: (a) constellation altitudes from low earth orbit (LEO) to geostationary (GEO) altitude; (b) any orbit inclination; and (c) radar frequencies extending from high frequency (HF) through the laser radar ("lidar") spectrum. (HF is normally not useful for surveillance of the Earth's surface or troposphere from space; however, it could be employed for topside "soundings" of regions of the Earth's ionosphere or to probe beneath the surface of other planets.)

A closing comment is offered here: Those skilled in the art will be aware that an alternative method of achieving a fine angular resolution with a limited amount of actual radar RF hardware comprises the use of a Mills Cross (Slattery, B. R., "Use of Mills cross receiving arrays in radar systems," Proc. IEE, pp. 1712-1722, November 1966), more widely employed in radio astronomy. In this latter method, the basic resolution is defined by the intersection of two fan beams. However, for measurements of regions on or above a planet's surface in a downlooking mode, it is extremely likely that a large number of echo sources (scatterers) will reside within specific range resolution "cells." In these cases, for Q "real" echo sources there will result Q times (Q-1) false intersections ("ghosts"). For example, for ten detectable scatterers within a specific range cell over a surveillance sector, there will be ten real targets and 90 ghost targets. Techniques exist for eliminating these ghost responses, as discussed in Slattery's paper cited above, but they involve a great deal of additional complexity; in any case, those are not MIMO techniques.

ILLUSTRATIVE EMBODIMENT OF THE METHOD

An illustrative embodiment of the present method will serve to broadly outline a smallsat-MIMO radar constellation design. The example is that of a scatterometer, of which many other types have been flown in the past to infer at-sea wind speeds by estimating sea state (i.e., wave height) on Earth. The "baseline" configuration in FIG. 2A, employing orthogonal waveforms, simultaneous overlapping surveillance sectors, and a radar RF wavelength of 0.25 meter (in the L-band microwave region), are assumed.

The assumed operation employs a constellation of 50 transmitting and 100 receiving smallsats in a roughly downlooking mode from an orbit altitude of 500 km. The Doppler spread due to the constellation motion limits, in practical terms, individual pulse widths to about 20 microseconds, resulting in a waveform duty factor of approximately 1.5 percent for the low pulse repetition frequency (PRF) needed to avoid range ambiguities.

For this example, a single helical antenna is selected for each transmitting and receiving smallsat, with the transmitting and receiving helices spiraled in opposite directions, respectively, in order to select principal, rather than opposite, received circular polarization. This provides an individual directive gain of 18.75 dBi (Sakovsky, M., et al, "Rapid design of deployable antennas for cubesats," IEEE Antennas and Propagation Magazine, pp. 50-58, April 2017). This value of gain allows spacings of not more than 0.56 meter between virtual elements (1.18-meter spacings for the actual smallsats), as limited by the need to avoid significant grating lobes. The result is a coherent virtual planar aperture with dimensions of approximately 50 by 25 meters, which is much larger than those of typical traditional individual spacecraft.

The result is a surveillance region of a half-power diameter of about 230-km on the ocean's surface. The minimum grazing angle in this example is 60 degrees. The corresponding angular resolution "cell" size on the surface is roughly 5.0 km by 2.5 km (half-power) directly beneath the constellation, and somewhat degraded off the nadir. This offers a huge improvement of resolution over previous and current scatterometers (Raney, R. K., "Space-Based Remote Sensing Radars," Chapter 16 in Radar Handbook, 3rd Ed., M. I. Skolnik (Editor), pp. 18.56-18.58, McGraw-Hill, 2009 and Florida State University, https://www.coaps.fsu.edulscatterometry/about/overview/php), and is fine enough to observe localized squalls and to provide excellent estimations of wind fetch. Moreover, the persistent observations of many cells over a wide ocean area can allow research on the effects of distant swells and also allow a simultaneous comparison of echoes between upwind-downwind-crosswind conditions.

For a peak power, per pulse, of 36 watts for each transmitting smallsat (0.54-watt average power) and a coherent integration interval of 0.23 second (as limited by the decorrelation time of calm waves), it should be possible to detect, at the far end of the surveillance region, a backscatter coefficient ($\sigma^o$) as small as −33 dB, which corresponds to calm sea states at 60-degree grazing angle (Nathanson, F. E., Chapter 7 in "Radar Design Principles," 2nd Ed., McGraw-Hill, 1990). Higher sea states result in shorter decorrelation times, but also result in larger backscatter coefficients, thereby acing together to preserve the detection sensitivity for the chosen power levels, as contained in Nathanson's text, cited above.

Remarkably, the measurement of the ocean surface illustrated above can be conducted over a very short interval (less than one second). It is pointed out here that such a brief measurement can, in practical terms, be repeated many times (over tens of seconds) during a single orbit pass of the smallsat constellation. This can permit multi-measurement averaging, or at least comparison, within a single orbit pass. This represents a very useful feature of the instant invention.

Using the "rule of thumb" offered by Peral, E., et al, in "Radar technologies for earth remote sensing from cubesat platforms," Proc. IEEE, pp. 404-418, March 2018, namely assignment of 5.5 kg mass per watt of average transmitted power by a smallsat, the aggregate mass of the constellation in this illustrative embodiment is estimated very conservatively as approximately several hundred kilograms. This represents a small fraction of what can be carried by a conventional large launch vehicle and also qualifies as a payload compatible with the use of a single small launch vehicle, of the type currently under development (Niederstrasser, C., "Small launch vehicles—a 2018 state of the industry survey," 32nd Annual AIAA/USU Conference on Small Satellites, 2018).

The latter illustrative embodiment was presented at a 2019 phased-array symposium (Weissman, I., "Smallsat Surveillance Constellations Using MIMO Radar," IEEE Phased Array Systems and Technology Symposium, Waltham, Mass., October 2019).

By extending this illustrative embodiment using the previous description, it should be understood that still finer resolution is obtainable. This can readily be achieved using smallsat antennas with even higher directive gain, such as by using, for example, unfurled paraboloid antennas. The higher gain permits wider smallsat spacings (conveniently, permitting larger antennas), resulting in finer resolution—but at the expense of a smaller surveillance sector, while providing persistent surveillance.

ADDITIONAL PRIOR ART

In addition to the Prior Art cited as technical references or critiqued in the above descriptions, others are listed in the updated Information Disclosure Statement by Applicant. Among these are the following:

U.S. Pat. No. 4,843,397 to Galati, et al, teaches the formation of a large space-based phased-array by employing a distribution of individual space-based antenna elements on separate satellites. However, there is no apparent use of either smallsats or MEMO.

U.S. Pat. No. 7,994,965 to Longstaff teaches the advantages of employing MEMO as a general radar technique. However, there is only a reference to many different geometries without including smallsat configurations or even satellite configurations in general.

U.S. Pat. No. 8,427,360 to Longstaff teaches the use of MIMO arrays for assisting vertical takeoff and landing (VTOL) operations for aircraft. However, there is no apparent use of smallsats, or even satellites in general.

U.S. Pat. No. 10,145,936 to Kishigami, et al, teaches the use of linear antenna arrays which, apparently, utilize MIMO techniques. (MIMO is referred to in the Patent.) However, the application of the Patent is apparently directed to automotive radar. There is no apparent consideration of smallsat configurations or even satellite configurations in general.

US Patent Application 2016/0221625 by Comic, et al, utilizes at least two orthogonal arrays for airspace "sense and avoid" purposes. Neither MIMO nor smallsats is included.

US Patent Application 2016/0204840 by Liu discusses 3-D MIMO imaging, apparently for application to automotive radar. Further, the approach seems to exploit radar platform velocity variations, as experienced in automotive radar. There is no apparent consideration of smallsat configurations or even satellite configurations in general.

Foreign Patent WO/2018/231515 to Maschhoff and Ryba teaches the use of smallsats for 3-D high-resolution weather measurements. Along-track data are obtained using very-short duration SAR (as limited by weather decoherence). The cross-track data are obtained by very long baseline interferometry (VLBI). The baseline configuration employs a single transmitting satellite (which is clearly contrary to MEMO configurations) and two or more receiving satellites with very wide spacings for conducting phase interferometry. Mention of more general embodiments does not include MIMO.

The listing of References previously cited in the unamended Specification, plus some additions, has been transferred to the updated Information Disclosure Statement by Applicant.

Signed:
Isaac Weissman

I claim:

1. A system, combining multiple input, multiple output (MIMO) arrangements and smallsat platforms, for conducting electromagnetic measurements from space of targets within a surveillance region above, below, or upon the surface of a planet, comprising:
    a constellation including at least one array of smallsats above said surveillance region, wherein each of said smallsats contains an antenna and at least one of a transmitter and receiver, said transmitter(s) of said smallsats being capable of transmitting electromagnetic signals to said surveillance region, said receiver(s) of said smallsats being capable of receiving echoes of said signals from said surveillance region, and the antenna of each smallsat being capable of illuminating part or all of said surveillance region;
    wherein a total of M transmitting smallsats of said smallsats are configured for transmitting signals that are substantially independent of each other;
    wherein a total of N receiving smallsats of said smallsats utilize a MIMO arrangement, in which each of the N receiving smallsats is capable of processing, by means of separate matched filters, each of said echoes, thereby creating a virtual aperture containing M×N virtual receiving elements;
    wherein said at least one array of smallsats is arranged so that at least one pair of array sections is simultaneously and mutually non-parallel, wherein said pair includes a first array section of smallsats capable of transmitting and a second array section of smallsats capable of receiving said echoes, thereby providing at least one two-dimensional cluster of simultaneous virtual receiving beams.

2. The system of claim 1, wherein spacings between adjacent smallsats and a directive gain of each of said antennae are together chosen to avoid the creation of grating lobes, and wherein a number and extents of the smallsats are chosen to attain a desired angular resolution.

3. The system of claim 1, wherein an orientation of the constellation is controlled to maintain a staring mode over a duration of a measurement, thereby enabling persistent observation of time-varying events within said surveillance region.

4. The system of claim 1, wherein relative positions of said smallsats within said constellation remain substantially fixed for the duration of a measurement.

5. The system of claim 4, wherein said smallsats are capable of sensing and correcting unintended perturbations of their positions and orientations.

6. The system of claim 1, wherein said smallsats are capable of completing a measurement within a single orbit pass of said constellation.

7. A method, drawing upon the synergy between MIMO arrangements and smallsat platforms, for conducting electromagnetic measurements from space of targets within a surveillance region above, below, or upon the surface of a planet, comprising, in a constellation including at least one array of smallsats above said surveillance region, wherein each of said smallsats contains an antenna and at least one of a transmitter and receiver, said transmitter capable of transmitting electromagnetic signals to said surveillance region, said receiver capable of receiving echoes of said signals from said surveillance region, and the antenna of each smallsat capable of illuminating part or all of said surveillance region:
    transmitting, from a total of M transmitting smallsats of said smallsats, signals that are substantially independent of each other;
    receiving, at a total of N receiving smallsats of said smallsats, echoes of said signals from said surveillance region;
    processing with a MIMO arrangement at each of said N receiving smallsats, by means of separate matched filters, each of said echoes, thereby creating a virtual aperture containing M×N virtual receiving elements;
    said at least one array of smallsats arranged so that at least one pair of array sections is simultaneously and mutually non-parallel, wherein said pair includes an array section of smallsats capable of transmitting and the other array section of smallsats capable of receiving said echoes, thereby providing at least one two-dimensional cluster of simultaneous virtual receiving beams.

8. The method of claim 7, wherein spacings between adjacent smallsats and a directive gain of each of said antennae are together chosen to avoid the creation of grating lobes, and wherein a number and extents of the smallsats are chosen to attain a desired angular resolution.

9. The method of claim 7, further comprising controlling an orientation of the constellation to maintain a staring mode over a duration of a measurement, thereby enabling persistent observation of time-varying events within said surveillance region.

10. The method of claim 7, wherein relative positions of said smallsats within said constellation remain substantially fixed for the duration of a measurement.

11. The method of claim 10, further comprising sensing and correcting unintended perturbations of the positions and orientations of said smallsats.

12. The method of claim 7, further comprising completing a measurement within a single orbit pass of said constellation.

\* \* \* \* \*

UNITED STATES PATENT AND TRADEMARK OFFICE
CERTIFICATE OF CORRECTION

PATENT NO. : 10,962,639 B2
APPLICATION NO. : 16/602965
DATED : March 30, 2021
INVENTOR(S) : Weissman It is certified that error appears in the above-identified patent and that said Letters Patent is hereby corrected as shown below:

In the Specification

In Column 1, Line 50, delete "Smalisats" and insert -- Smallsats, --, therefor.
In Column 3, Line 37, delete "MEMO" and insert -- MIMO, --, therefor.
In Column 4, Line 9, delete "MEMO" and insert -- MIMO, --, therefor.
In Column 4, Line 23, delete "MEMO" and insert -- MIMO, --, therefor.
In Column 8, Line 64, delete "TEE" and insert -- IEE, --, therefor.
In Column 10, Line 60, delete "MEMO" and insert -- MIMO, --, therefor.
In Column 10, Line 62, delete "MEMO" and insert -- MIMO, --, therefor.
In Column 11, Line 27, delete "MEMO" and insert -- MIMO, --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*